INVENTOR.
LISLE G. HUMPHREYS
BY
ATTORNEY

July 17, 1962 L. G. HUMPHREYS 3,044,372
MACHINE AND METHOD FOR MAKING HELICALLY WOUND TUBING
Filed Jan. 28, 1959 7 Sheets-Sheet 2
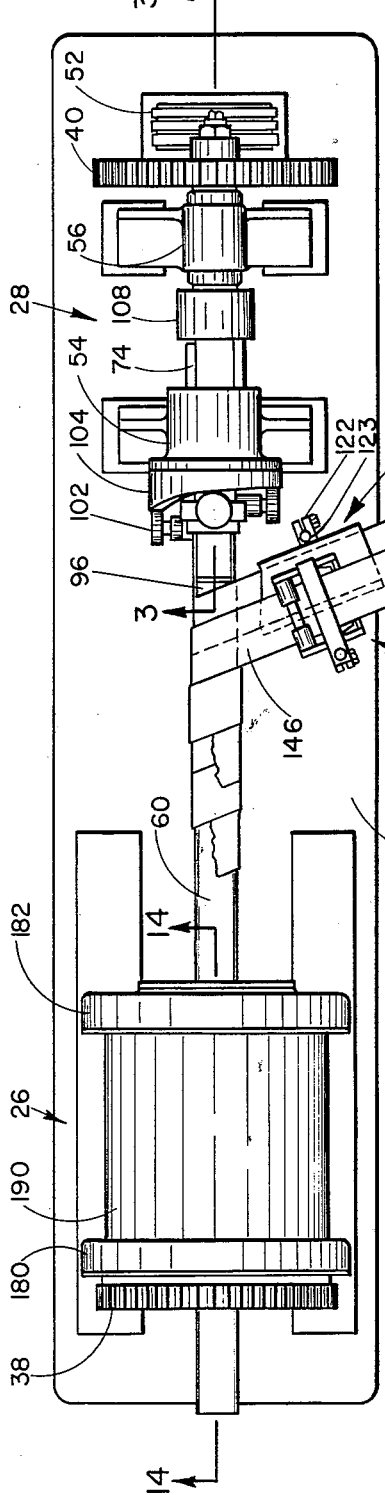
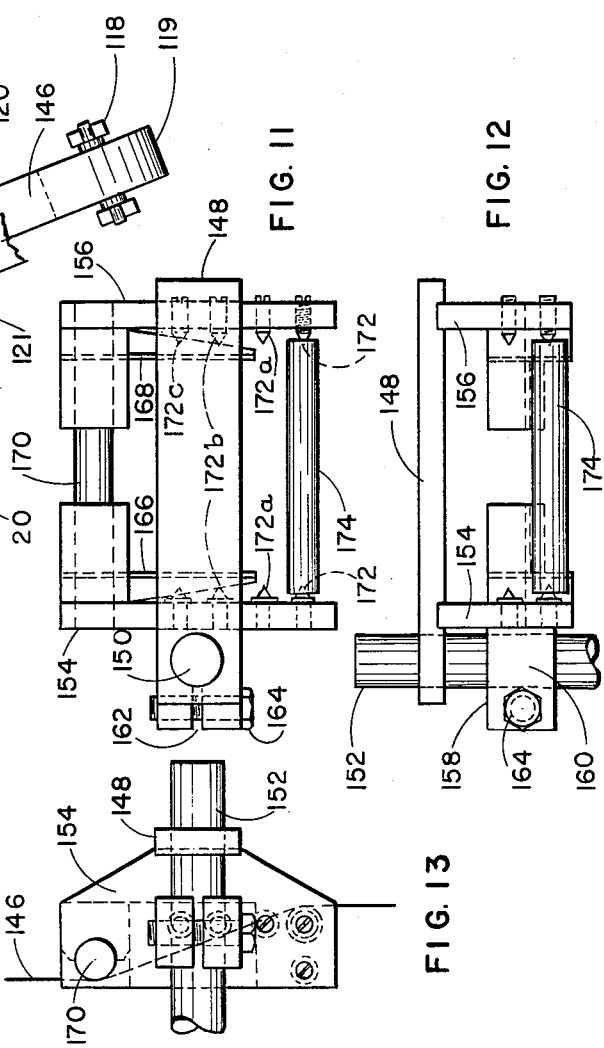
INVENTOR.
LISLE G. HUMPHREYS
BY
ATTORNEY

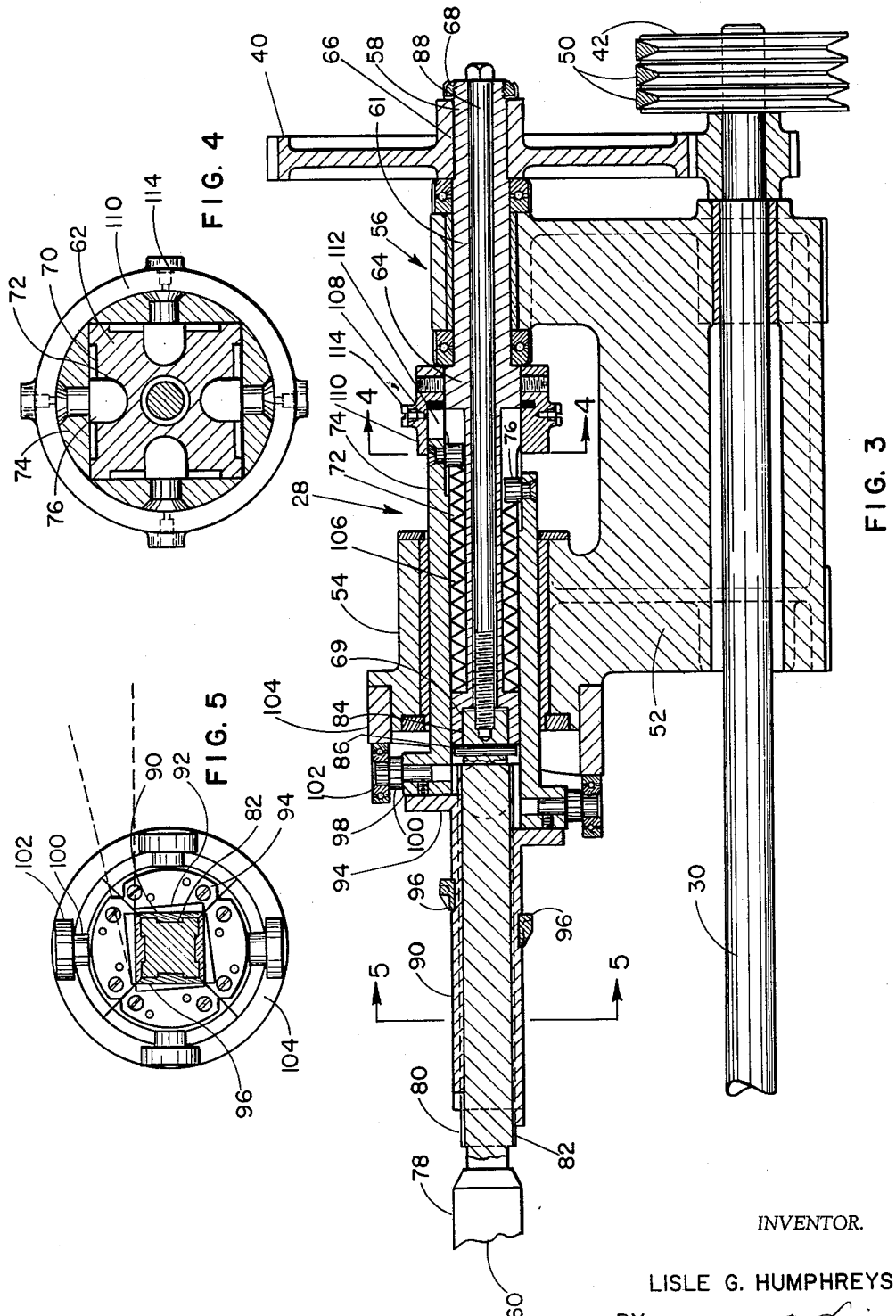

INVENTOR.
LISLE G. HUMPHREYS

July 17, 1962 L. G. HUMPHREYS 3,044,372
MACHINE AND METHOD FOR MAKING HELICALLY WOUND TUBING
Filed Jan. 28, 1959 7 Sheets-Sheet 5

INVENTOR.
LISLE G. HUMPHREYS
BY
ATTORNEY

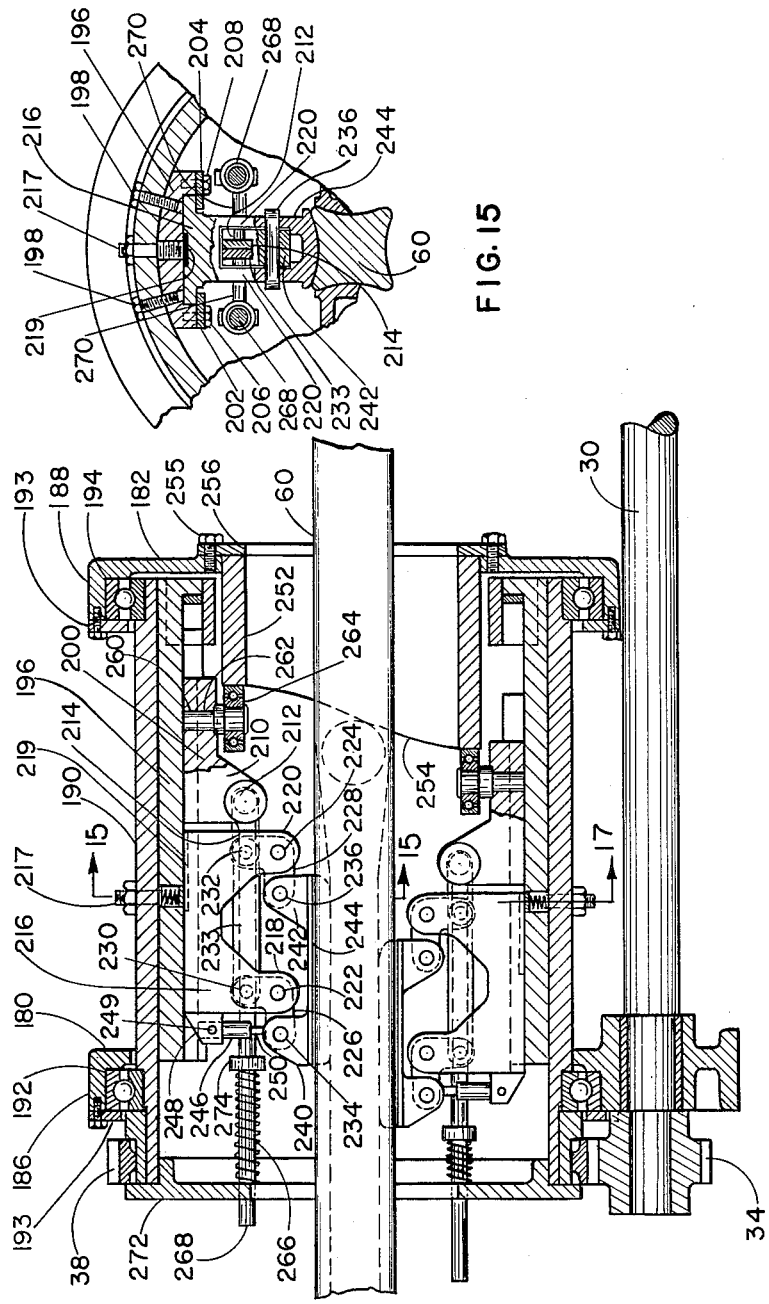

July 17, 1962 L. G. HUMPHREYS 3,044,372
MACHINE AND METHOD FOR MAKING HELICALLY WOUND TUBING
Filed Jan. 28, 1959 7 Sheets-Sheet 7

INVENTOR.
LISLE G. HUMPHREYS
BY
ATTORNEY

United States Patent Office 3,044,372
Patented July 17, 1962

3,044,372
MACHINE AND METHOD FOR MAKING HELICALLY WOUND TUBING
Lisle G. Humphreys, Rochester, N.Y., assignor to M. D. Knowlton Company, Rochester, N.Y., a corporation of New York
Filed Jan. 28, 1959, Ser. No. 793,658
3 Claims. (Cl. 93—80)

This invention relates to methods and machines for producing helically wound tubing, one object being the provision of a more satisfactory machine for this purpose.

Helically wound paper tubing finds a number of uses in industry, being used for mailing tubes, for the side walls of paper or cardboard canisters, coil cores, and other applications requiring a tubular paper part. It is often desirable to have paper tubing of the above nature of non-circular or polygonal cross-section for use in the manufacture of containers or cores which will stack or nest more easily. For this purpose, such tubing is most frequently required in square or rectangular cross-section, as is well known in the art. The provision of a method for the manufacture of such paper tubing of non-circular cross-section and a machine for employing the same are other objects of this invention.

Helically wound paper tubing of the above description is most frequently manufactured by winding a plurality of strips of paper or other suitable web material on the mandrel or spindle, the tubing being moved forwardly on the spindle as it is wound. Additional layers of strip material are often wound on the tubing in order to build up the thickness and strength of the tube. In cases like this, the additional strips are usually longitudinally offset with respect to the strips immediately below in order to cause each strip to overlap the joint between the strip immediately below it to produce a tube having a maximum strength. Provision of a machine for continuously winding a helical tube of strips of paper or other web material in this manner is therefore another object of this invention.

In the manufacture of paper tubing by the continuous process as described above, it is necessary to move the paper tube longitudinally along the spindle at the rate at which it is wound in order to manufacture tubing in continuous lengths. The provision of means for moving the paper tube on the spindle at a rate synchronized with the winding thereof is another object of this invention.

In the manufacture of tubing of polygonal or other non-circular cross-section, the paper strips are generally wound on a spindle having a cross-section corresponding to that of the desired finished tube. The provision of a machine having such a polygonal spindle is therefore another object of this invention.

It has been found in practice that even when the tubing is wound on a spindle having polygonal cross-section that the tubing when removed from the spindle tends to bow outwardly and to assume a more rounded shape. It is found that this tendency of the paper tube can be counteracted by creasing the paper tube sharply at the intersections between adjacent faces of the polygonal tube already formed. This creasing is most effective when the tube is sharply creased at the intersections between each face of the polygon, and the faces of the tube are bowed inwardly between the intersections, so that when the tube is removed from the spindle, it will resiliently spring back and assume the desired polygonal shape. The provision of a machine having means for sharply creasing the tube at the intersections between the adjacent polygonal faces and at the same time bowing the polygonal faces of the tube inwardly before it has been removed from the spindle therefore is another object of this invention.

Other objects of this invention include the provision of a machine which is capable of manufacturing continuous lengths of tubing in any desired polygonal shape, and having any desired number of layers of overlapping helically wound paper strips.

Further objects of this invention include the provision of a machine that is fully automatic in operation, and which once having been set up, will manufacture a continuous length of paper tube of the desired cross-section without further attention from the operator.

Still further objects include the provision of a machine of the above description which is relatively simple, positive in operation, and relatively inexpensive to manufacture.

Other objects and advantages of our invention will be particularly set forth in the claims and will be apparent from the following description, when taken in connection with the accompanying drawings, in which:

FIG. 2 is a top plan view of the machine of FIG. 1;

FIG. 3 is an enlarged fragmentary cross-sectional view taken substantially along the lines 3—3 of FIG. 2;

FIG. 4 is a further enlarged cross-sectional view taken substantially along the lines 4—4 of FIG. 3;

FIG. 5 is a cross-sectional view taken substantially along lines 5—5 of FIG. 3;

FIG. 11 is an enlarged top plan view of a second strip guide removed from the machine for purposes of clarity;

FIG. 12 is an end elevational view of the guide of FIG. 11;

FIG. 13 is a side elevational view of the guide of FIG. 11;

FIG. 14 is an enlarged fragmentary cross-sectional view taken along lines 14—14 of FIG. 2;

FIG. 15 is an enlarged fragmentary cross-sectional view taken along lines 15—15 of FIG. 14;

Referring now to the figures, a tube machine embodying the present invention and herewith described for purposes of illustration, preferably comprises a frame, a rotating spindle, means for wrapping strips of paper or other suitable web material around the spindle to form a tube thereon, means for moving the tube longitudinally along the spindle and means for creasing the tube to cause it to assume polygonal shape.

Figure 1:
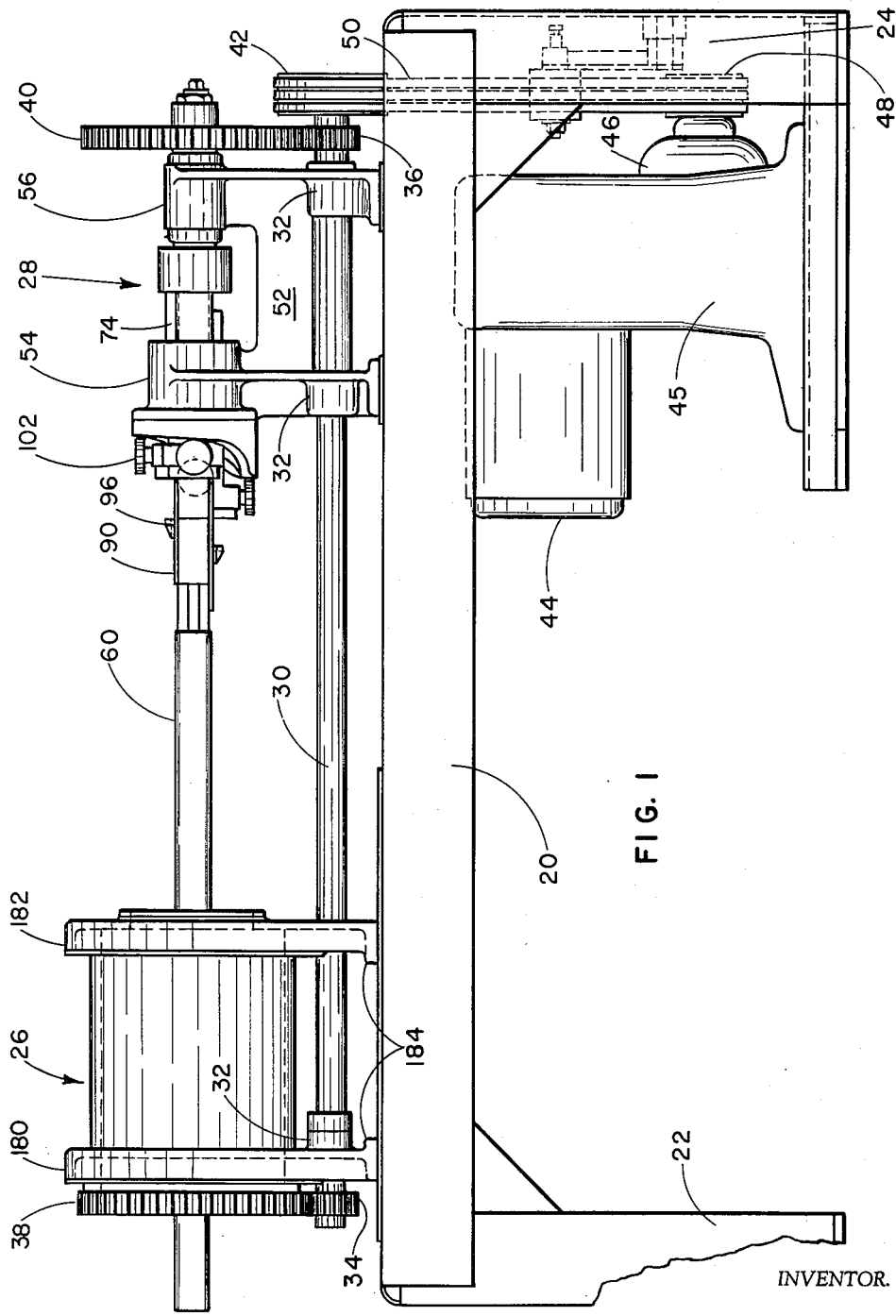
FIG. 1 is a side elevational view of a paper tube machine embodying the present invention.

The frame comprises a horizontal bed 20 (FIG. 1) supported at each end by a front pedestal 22 and a rear pedestal 24, respectively. Bed 20 is provided with a head stock shown generally at 26 and a tail stock shown generally at 28 in FIG. 1. Head stock 26 contains the means for creasing the tube to cause it to assume polygonal shape, while tail stock 28 contains the mechanism for rotating the spindle and for moving the paper tube longitudinally on the spindle, as hereinafter described.

A horizontally extending drive shaft 30 is supported above bed 20 by suitable journals 32 in head stock 26 and tail stock 28. A pair of identical pinions 34 and 36 are mounted on shaft 30. Pinion 34 meshes with a ring gear 38 which forms part of the mechanism of head stock 26. Pinion 36 meshes with a gear 40 which forms part of the mechanism of tail stock 28. Both of these mechanisms will be hereinafter described in detail. A sheave 42 is mounted on the extreme rear end of shaft 30. Drive shaft 30 is driven by means of a variable speed electric motor 44 mounted on a base 45 through a speed reducer 46, a sheave 48, and V-belts 50 which run on sheave 42, described above.

Tail stock 28 comprises a body portion 52 which is rigidly mounted adjacent the rear portion of bed 20. Body portion 52 comprises a pair of axially aligned upper bearing portions 54 and 56, for supporting a spindle extension 58 (FIG. 3), and the spindle 60, above mentioned.

Spindle extension 58 comprises a horizontally extending elongated member having a cylindrical rearward portion 61 adapted to rotate in bearing assembly 56 on tail stock 28, and a square forward portion 62 (FIG. 4). An enlarged portion 64 of square cross-section is positioned between cylindrical portion 61 and square portion 62, and the rear end of portion 61 terminates in a threaded end 68 for the reception of gear 40. The forward end of squared portion 62 is hollowed out to form a cup-shaped member 69 which is adapted to engage spindle 60, as hereinafter described.

The faces of square forward portion 62 of shaft 58 are provided with longitudinally extending shallow depressions 70 (FIG. 4). The center of depressions 70 are further provided with longitudinally extending relatively narrow grooves 72 having rounded bottoms. Each surface of square portion 62 carries a segmental shaped member 74 having an inwardly extending lug 76 which fits into groove 72. The arcuate outer surfaces of segmental members 74 fit the inside surface of forward bearing 54 of tail stock 28 and rotate therein with extension 58 as a unit, although the segmental members are free to move longitudinally during this rotation.

Spindle 60 is supported above and in parallel relationship to the bed 20 by extension 58. Spindle 60 includes a square portion 78, a reduced square section 80 having longitudinal grooves 82 (FIG. 5) therein and a rear cylindrical portion 84 (FIG. 3). Cylindrical portion 84 is adapted to mate with cup-shaped member 69 on extension 58. Cylindrical portion 84 is transversely slotted and cup 69 is transversely drilled to receive a locking pin 86 which prevents relative rotation between these parts. Extension 58 is fastened to the spindle 60 by means of a threaded shift 88 which extends through the hollow portion of extension 58 and threadedly engages the end of cylindrical portion 84. Pin 86 and shaft 88 lock spindle 60 and spindle extension 58 into a single integral unit.

Each face of reduced portion 80 of spindle 60 carries longitudinally movable slide members 90. Slide members 90 have substantially flat outer surfaces and are provided with longitudinal keys 92 on their lower surfaces adapted to engage the slide in grooves 82. The upper surfaces of slide members 90 are level with, parallel to and form extensions of the sides of square portion 78 of spindle 60. The rear ends of slide members 90 terminate in sector-shaped plates 94 extending outwardly at right angles to the axis of spindle 60. The outer surface of follower slides 90 carry diagonally disposed follower lugs 96 which are adapted to engage the end of the paper tube as it is formed on the spindle, and to move the same longitudinally therealong as will be hereinafter further explained.

The rear surfaces of sector plates 94 are fastened to longitudinally extending segment-shaped members 74. Members 74 terminate at their forward ends in outwardly extending cylindrical bosses 98 which are bored in a direction transverse to the axis of spindle 60 to receive a series of stub shafts 100 provided with rollers 102. Rollers 102 engage the front surface of a cylindrical cam 104 which is mounted on the front surface of stock 28. When spindle 60, extension 58 and segment members 74 rotate about the axis of the spindle, rollers 102 roll along the shaped surface of cam 104 which forces the bearings and stub shafts 100 forwardly, thereby moving segment members 74 and the attached slide members 90 in a forward direction.

The forward motion of each slide member 90 is opposed by a spring 106, disposed in a longitudinal slot 72 in spindle extension 58. The front ends of these springs abut against the rear surface of cup 69, and the rear ends of these springs abut against a lug 76 extending inwardly from the inner surface of each segment member 74. Thus, when a roller 102 drops off the high portion of cam 104, relieving the forward force from its segmental member 74, its spring 106 forces it to the rear, retracting the slide member 90 attached thereto. Thus, the slide members are forced forwardly in sequence as the spindle 60 rotates, and as each slide member reaches its forwardmost portion, its particular roller 102 moves off the high spot of cam 104, and this particular slide member then is moved to the rear under the urging of its spring 106. Since the rollers 102 associated with each slide member 90 follow each other in a circular path around the surface of cam 104, slide members 90 are reciprocated in sequence, each slide member being in turn forced forwardly and released to be returned to its original rearward position under the action of its spring.

It has been found that when the machine is operating at normal production speed, the rearward movement of slide members 90 must be rapidly completed in order to have the slide member in position behind the next layer of the tube being formed. This is accomplished by the use of strong springs. However, the rapid rearward movement of the slide member and its associated parts must be stopped prior to another forward movement, and this sudden deceleration results in considerable shock. In order to remedy this, shock absorbing means are provided for cushioning the rearward movement and bringing the segment members to a gradual stop. These means preferably comprise a collar 108 mounted on enlarged portion 64 of extension 58. Collar 108 is provided with an integral forwardly extending cylindrical lip 110 which fits around the arcuate portion of segmental member 74 (see FIG. 4). As a segmental member moves to the rear, it enters lip 110, and air is trapped in the segmental space 112 (FIG. 3) bounded by member 74, lip 110 and the front portion of collar 108. This air forms a cushion, and prevents further rapid movement of the rear of segmental member 74. This air is allowed to escape through a bleeder valve 114 mounted on lip 110 which allows the slow escape of this air, so that segment member 74 and its associated parts are allowed to come slowly into their rearmost position without shock or damage.

The means for supplying the paper to be wrapped about the spindle comprises a plurality of roll holding devices, one of which is shown at 118 (FIG. 2) adapted to hold rolls 119 of paper strip. Any number of roll holding devices may be used, depending on the number of layers of paper being used to form the tube.

In order to have the paper strips wind smoothly and evenly upon the spindle it is necessary to provide guiding means for taking the strips from the paper rolls and guiding the same to the spindle at the proper angle. Further, the strips must be properly spaced in order to produce smoothly abutting joints between adjacent turns, and to have each strip overlap the joint between the strip immediately below in order to form a strong homogeneous tube.

The first strip applied to the spindle must have a lubricant, or other slippery substance applied to its under surface in order to make it slide smoothly along the spindle as the tube is formed. To this end, a first guide means 120 is provided having means for applying a thin layer of paraffin wax or other similar slippery substance to the underside of the paper strip.

Figure 9:
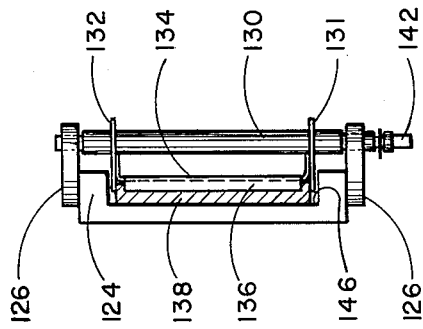
FIG. 9 is an end elevational view of the guide of FIG. 8.
Figure 10:
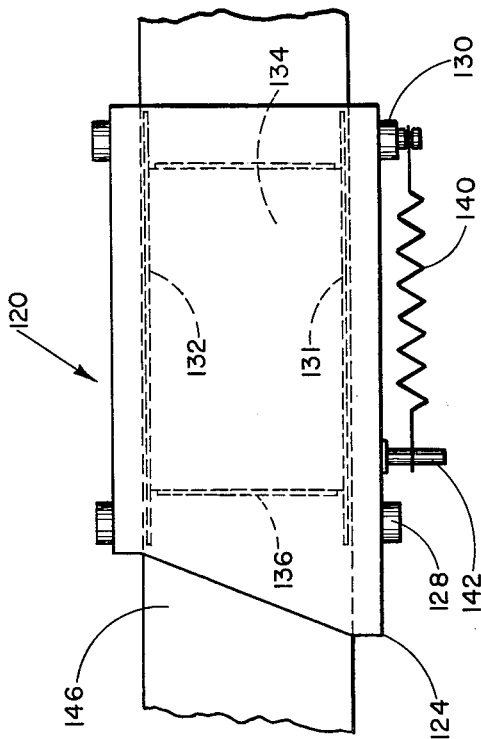
FIG. 10 is a top plan view of the guide of FIG. 8.
Figure 8:
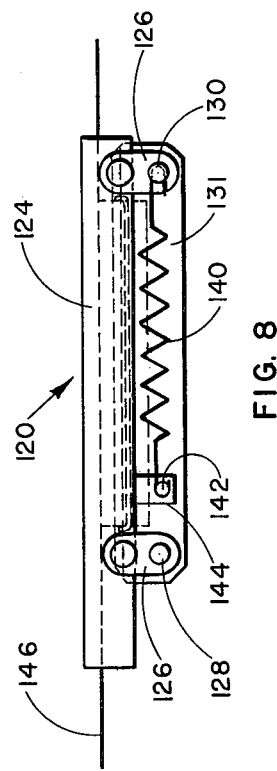
FIG. 8 is an enlarged side elevational view of a strip guide removed from the machine for purposes of illustration.

First guide means 120 (FIGS. 8, 9, and 10) is supported above bed 20 by means of a vertically extending post 123 (FIG. 2) and a clamp 122. The guide means preferably comprises an elongated frame member 124 of generally inverted U-shaped cross-section (FIG. 9) pivotally supporting four downwardly depending links 126. Links 126 support a pair of spaced transversely extending shafts 128 and 130, which in turn support a pair of spaced, longitudinally extending members 131 and 132. Members 131 and 132 carry a pan 134 having upturned flanges 136 for containing a block of paraffin wax 138 in parallel relation to frame member 124. A spring 140 (FIGS. 8 and 10) extends from one end of a shaft 130 to an outwardly extending stud 142 on an arm 144 fastened to U-shaped frame member 124. Spring 140 resiliently urges pan 134 in a forward direction, in parallel motion, to urge paraffin block 138 against frame 124. The strip of paper 146 is led between paraffin block 138 and frame 124.

As paper strip 146 is fed from roll holder 118, it is supported and guided by U-shaped frame 124, which engages the upper surface and both edges thereof, assuring the proper alignment of the strip. Paraffin block 138 is held in resilient contact with the lower surface of the strip thereby holding it in position in frame 124 and depositing a thin coat of paraffin on the lower surface of the paper prior to its being wrapped on spindle 60.

The remainder of the guiding means 121 (FIG. 2) serve merely to feed the subsequent paper strips to spindle 60 at the proper angle. Guiding means 121, one of which is illustrated in FIGS. 11 to 13, inclusive, comprise a transversely extending member 148 having a hole 150 (FIG. 11) near one end. Hole 150 is adapted for a sliding fit on a vertically extending post 152 (FIGS. 12 and 13) similar to post 123 described above. A pair of spaced, vertically extending plates 154 and 156 are fastened to member 148. Plate 154 is provided with an outwardly extending lug 158 (FIG. 12) having a hole 160 positioned under and directly in line with hole 150 in member 148. Lug 158 is split adjacent to hole 160 as shown at 162 (FIG. 11), and the split portion thereof may be drawn together by means of a bolt 164 in order to clamp lug 158 to column 152.

The forward ends of plates 154 and 156 carry a rod 170 which controls the angle at which the paper is fed to the spindle 60. A pair of paper guides 166 and 168 are adjustably mounted on rod 170 to engage the edges of the paper strip for transversely positioning the same as it passes through the guiding means. The rearward portions of plates 154 and 156 are provided with a plurality of conical points 172 arranged in longitudinally spaced pairs at intervals along the plates. Pivots 172 are adapted to hold a second rod 174 which feeds the paper to rod 170. Rod 174 may be positioned between any pair of points 172 to assure that the paper will always contact the underside of rod 170 to compensate for the angle at which the paper strip approaches the guiding means.

It may be appreciated that where a tube is to be made of a number of overlapping paper strips, successive strips must approach the spindle at a progressively smaller angle to the horizontal. In order to accomplish this, each guiding means 121 must be positioned above the preceding guiding means. The paper strip thus leaves the rod 170 of successive guiding means at progressively smaller angles. In order to assure firm contact of the strip with rod 170, rod 174 must be positioned relatively close to rod 170 in order that the proper angle between the opposing surfaces of these rods will be provided. This may be accomplished by positioning rod 170 between centers 172a or 172b rather than between centers 172 as shown in FIG. 11.

It may be appreciated that any number of guiding means 121 may be provided depending upon the number of strips of overlapping paper to be used in forming a particular tube. However, only one of these has been described since the structure, function and mode of operation of the additional paper guide means are identical to those described above.

The means for creasing the paper tube wound on the polygonal spindle to cause it to assume permanent polygonal shape are contained in head stock 26 mounted on the forward end of bed 20. Head stock 26 comprises a pair of generally ring shaped supporting members 180 and 182 (FIG. 1) attached to bed 20 by means of flanges 184. Members 180 and 182 are provided with forwardly extending annular flanges 186 and 188 (FIG. 14) which rotatably support a horizontal cylindrical member 190. Bearings 192 and 194 are interposed between annular flanges 186 and 188 and the front and the rear ends of cylindrical member 190 in order to provide for smooth rotation of the latter. Bearings 192 and 194 are held in place by means of rings 193 bolted to flanges 186 and 188 as shown.

The tube creasing means are fastened to the inner surface of cylindrical member 190 and rotate therewith in order to crease the tube at each intersection of the faces or sides of the polygonal tube as it passes through the tail stock. The number of these creasing means depends on the number of sides of the polygonal cross-section of spindle 60, one such means being provided for every side thereof. However, since they are all identical, only one of such means will be described.

The creasing means is supported by a longitudinally extending generally U-shaped member 196 (FIG. 15), having an outer surface of cylindrical configuration in order to fit tightly against the inner surface of cylindrical member 190. U-shaped member 196 is held rigidly in position by means of bolts 198 extending through suitable holes in cylindrical member 190 as shown. A longitudinally extending T-shaped slide 200 (FIG. 14) is mounted in the track formed by U-shaped member 196, and is held in place by means of a pair of inwardly extending flanges 202 and 204 (FIG. 15) which are fastened to the ends of the legs of U-shaped member 196 by means of bolts 206 and 208 respectively. T-shaped slide 200 is provided with a pair of inwardly extending spaced flanges 210 (FIG. 14) which are transversely drilled to receive a pin 212. A forwardly extending link 214 is pivotally mounted on pin 212.

A second T-shaped slide 216 (FIGS. 14 and 15) is mounted in the track formed by U-shaped member 196, and is held in place by flanges 202 and 204 (FIG. 15). Slide 216 is held in tight sliding contact with flanges 202 and 204 by means of a screw 217 which abuts a wear plate 219 set in the top of the slide. Slide 216 is provided with two pairs of spaced inwardly extending flanges, 218 and 220 (FIG. 14) which are transversely bored for the reception of a pair of pins 222 and 224, respectively. Each of pins 222 and 224 supports L-shaped brackets 226 and 228. The upper ends of brackets 226 and 228 are bifurcated and transversely bored to receive pins 230 and 232, respectively. Pin 232 pivotally connects the upper end of bracket 228 to forwardly extending link 214, described above. A second link 233 connects pins 230 and 232.

The lower ends of brackets 226 and 228 are also transversely bored for receiving a pair of pins 234 and 236. Pins 234 and 236 are journaled in a pair of transverse bores in upwardly extending ears 240 and 242 on a shoe member 244 which bears against spindle 60. A small pawl 246 is attached to a projection 248 of slide 216 by means of pin 249. Pawl 246 contains a screw 250 which bears against ear 240 to limit the upward movement of shoe 244. Shoe 244 engages the sides of polygonal spindle 60, forcing the paper tube against the spindle for creasing the corners to cause the paper tube to assume permanent polygonal shape. In order to assist in this action, the sides of spindle 60 are curved inwardly as shown in cross-section in FIG. 15, to form a substantially hypocycloidal shape having rounded corners. This creasing action will be hereinafter described in greater detail.

Means are provided for causing shoe member 244 to reciprocate in a longitudinal direction along spindle 60. This means comprises a cylindrical cam 252 positioned coaxially with spindle 60, and having a shaped front end 254. Cam 252 is fastened to supporting member 182 by means of an outwardly extending annular flange 256 attached to the rear surface of member 182 by means of bolts 255. Slide 200 contains transverse bore 260 supporting an inwardly extending stub shaft 262. A suitable ball or roller bearing 264 is mounted on the inner end of stub shaft 262, and engages surface 254 of cam 252. Thus, when cylindrical member 190 rotates in bearings 192 and 194, it causes slide 200 and stub shaft 260 to rotate about the axis of spindle 60. As these parts rotate about axis of spindle 60, bearing 264 rolls along surface 254 of cam 252, which causes slide 200 to move in a forward direction (towards the left as viewed in FIG. 14). This forward motion of slide 200 is resiliently opposed by means of a pair of coil springs 266 which encircle a pair of rods 268 which are mounted on transversely extending pins 270 (FIG. 15) in flanges 210 on slide 200. Springs 266 are compressed between a plate 272 fastened to the forward end of cylindrical member 190 and collars 274 fixed to rods 268. Thus, as slide 200 moves in a forward direction, rods 268 also move in the forward direction, and springs 266 are compressed between collars 274 and plate 272, thereby opposing the motion of the slide. When bearings 264 roll off the high portion of cam surface 254, the force exerted by springs 266 against collars 274 forces slide 200 in a rearward direction (to the right as viewed in FIG. 14), maintaining bearings 264 in contact with surface 254. Thus slide 200 is caused to reciprocate backwardly and forwardly as cylindrical member 190 rotates about the axis of spindle 60.

As slide 200 moves in a forward direction (to the left as viewed in FIG. 14) links 214 and 233 apply a forward force to pivots 230 and 232 on L-shaped links 226 and 228. This tends to rotate L-shaped links 226 and 228 in a counterclockwise direction about pivots 222 and 224, and at the same time applies a force in a forward direction to pivots 222 and 224. The counterclockwise rotation of L-shaped links 226 and 228 forces shoe member 244 downwardly in parallel motion, thereby forcing the shoe against the spindle. At the same time, the forward force applied to pivots 222 and 224 causes slide 216 to move forwardly along with slide 200. This causes the shoe, which is bearing against the spindle, to move the paper tube on the spindle in a forward direction. When bearings 264 roll off the high portion of cam surface 254, slide 200 begins to move rearwardly (towards the right as viewed in FIG. 14) under the urging of the springs 266, as described above. When this occurs, a rearward force is applied to pivots 230 and 232 by links 214 and 233, which tends to lift shoe 244 somewhat off the spindle 60, relieving the pressure thereon, and at the same time moves slide 216 and the shoe towards the rear. This lifting movement of shoe 244 is limited by screw 250.

From the above it may be seen that shoes 240 are reciprocated in sequence. Each shoe moves forward in turn to urge the paper tube on spindle 60 in a forward direction, creasing the portion of the paper tube lying thereunder. When each shoe has reached its forwardmost position, it is lifted off the tube and moves to the rear. The forward action of the shoe not only creases the paper tube but also tends to aid follower slides 90 of stock 28 causing forward motion of the tube as it is formed on the spindle. This action is continuous, and thus continuously creased polygonal tube is formed.

The rotation of cylindrical member 190 which causes the reciprocating motion of shoes 240, is caused by ring gear 38, which is driven by pinion 34 on shaft 30 as described above. Pinion 34 is of the same size and has the same number of teeth as pinion 36 which drives gear 40 of tail stock 28, and thus tail stock 28 rotates in synchronization with cylindrical member 190.

The rising surface of cam 252 is identical with the rising surface of cam 104 of tail stock 28, so that the forward movement of shoes 242 is in synchronization with the forward movement of follower slides 90. This allows these parts to cooperate in moving the paper tube forwardly as it is formed on spindle 60. The angle of the paper guiding means is carefully adjusted so that the strips are wound on the spindle to form a helical tube wherein the edges of successive turns abut each other to form a continuous tube. The rising surface of both cams are formed to correspond to the helix angle of the tube, so that the tube is moved forwardly at the same rate it is wound on the spindle.

The falling surfaces of cams 252 and 104 do not correspond. The falling surface of cam 104 is abrupt to allow follower slides to snap back rapidly in order to be in position to engage the rear edge of the next turn of paper to be wound on spindle 60. In contrast, the falling surface of cam 252 is relatively gradual, in order to allow shoes 240 to return more slowly. For this reason, no shock absorbing is required in head stock 26.

Figure 17:
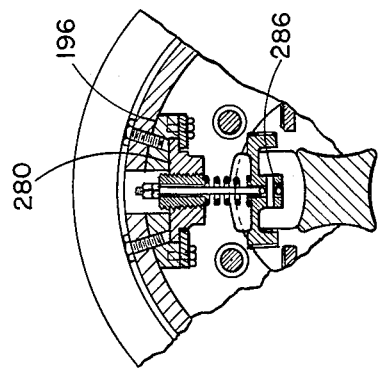
FIG. 17 is a cross-sectional view taken substantially along lines 17—17 of FIG. 16.
Figure 16:
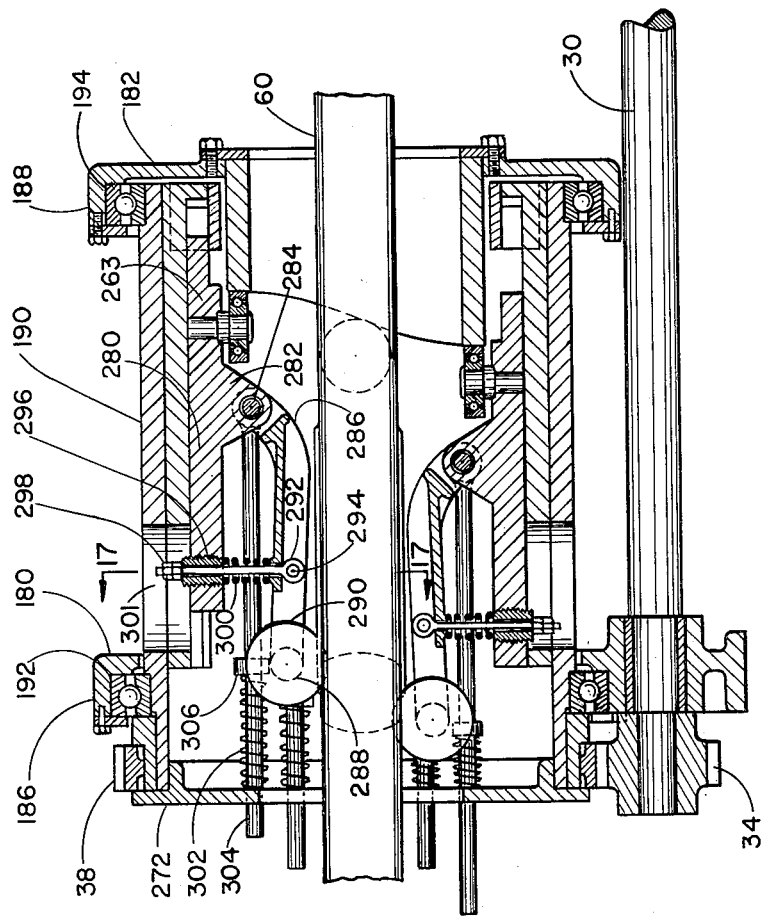
FIG. 16 is a fragmentary cross-sectional view similar to that of FIG. 14 of an alternate creasing means.

A second and modified embodiment of the creasing means is shown in FIGS. 16 and 17. This creasing means is similar to that described above, having a cylindrical member 190 rotatably mounted in bearings 192 and 194 in ring shaped frame means 186 and 188 as described above. Cylindrical member 190 contains an inner U-shaped member 196, supporting a T-shaped slide 263 as described above. T-shaped slide is moved in reciprocal motion by means of a bearing 264 on an inwardly extending stub shaft 262 which engages the surface of a cam 252. The above parts are identical to and function in the same manner as the correspondingly numbered parts shown in FIG. 14 and described above.

In the modified version of the creasing means, slide 263 is provided with a forwardly extending portion 280 having a pair of downwardly extending ears 282, which are transversely bored for the reception of a pin 284. Pin 284 pivotally supports a forwardly extending U-shaped arm 286. The forward end of arm 286 is bifurcated and transversely bored to receive an axle 288 which carries a barrel shaped roller 290 which bears against spindle 60. Rollers 290 are provided with overriding clutches or similar devices (not shown) which allow them to rotate when moving in a rearward direction (towards the right as viewed in FIG. 16) only. Roller 290 is held in tight engagement with spindle 60 and the paper tube by means of a plunger 292 which is pivotally attached to the intermediate portion thereof by means of a pin 294. Plunger 292 extends upwardly through a bushing 296 which is threadedly mounted in extension 280 of slide 263. Plunger 292 is adjustably mounted in bushing 296 and locked by a pair of nuts 298. A spring 300 is interposed between arm 286 and bushing 296 to resiliently force arm 286 downwardly to hold roller 290 in tight engagement with the spindle. The force exerted by spring 300 may be controlled by adjusting the position of threaded bushing 296 through an opening 301 in cylindrical member 190 which is provided for this purpose.

The forward motion of slide 263 caused by cam 252 is opposed by a spring 302 surrounding a rod 304 which is pivotally attached to extension 280 at pin 284. The forward end of spring 302 abuts against plate 272, while the rear end of the spring abuts against an adjustable collar 306 on rod 304. As slide 263 moves forwardly (toward the left as viewed in FIG. 16), spring 302 is compressed between plate 272 and collar 306 opposing the forward movement of slide 263. As soon as bearings 264 roll off the high spot of cam 252 this spring forces the slide to the rear to accomplish the reciprocating motion described above in connection with the first modification of the creasing means shown in FIG. 14.

The modification of the creasing means shown in FIG. 16 operates in essentially the same manner as the modification shown in FIG. 14, with certain minor differences. The pressure of rollers 290 against spindle 60 is constantly maintained throughout the entire cycle of movement by means of spring 300. On the forward movement, rollers 290 are locked against rotation by the overriding clutch mechanism mentioned above, and thus the rollers aid in moving the tube on the spindle in forward direction. However, during their rearward movement, the rollers are free to roll over the tube, and thereby do not interfere with or impede the forward motion of the tube. However, since the pressure of the rollers against the spindle is maintained during this rearward movement, the rollers force the tube against spindle 60, creasing it. In all other respects, this modification of the creasing device operates in a manner identical to that of the first embodiment described herein.

In operation, the machine is first set up with a spindle of the desired size and cross-sectional shape, corresponding to the tube to be manufactured. The paper strip holders 118 and paper guides 120 and 121 are then positioned to feed the desired numbers of paper strips in order to provide a tube of the desired thickness. Paper guide 120, which feeds the first or inner most strip of paper, is accurately aligned at the correct angle in order to form the helical tube. The position of guide means 120 must be accurately adjusted so that the paper feeds onto the spindle with its rearmost edge in contact with the diagonally oriented front edge of lug 96 as shown in FIG. 2. The remaining guides 121 are then accurately positioned in order to feed the paper at the proper relative position and angle to overlap the junction between adjacent turns of the underlying strip. The first few turns of the strips are preferably applied manually in order to start the tube as shown in FIG. 2. The machine is then ready for operation, and power is supplied to motor 44 for driving the machine.

Figure 7:
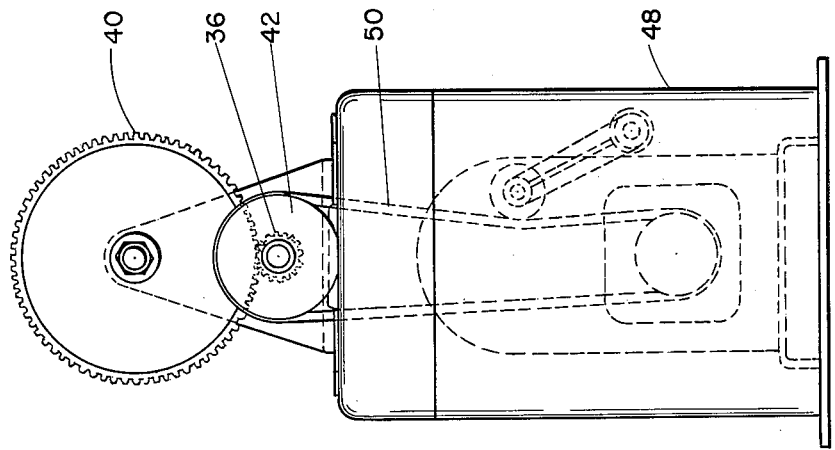
FIG. 7 is a rear end elevational view of the machine of FIG. 1.
Figure 6:
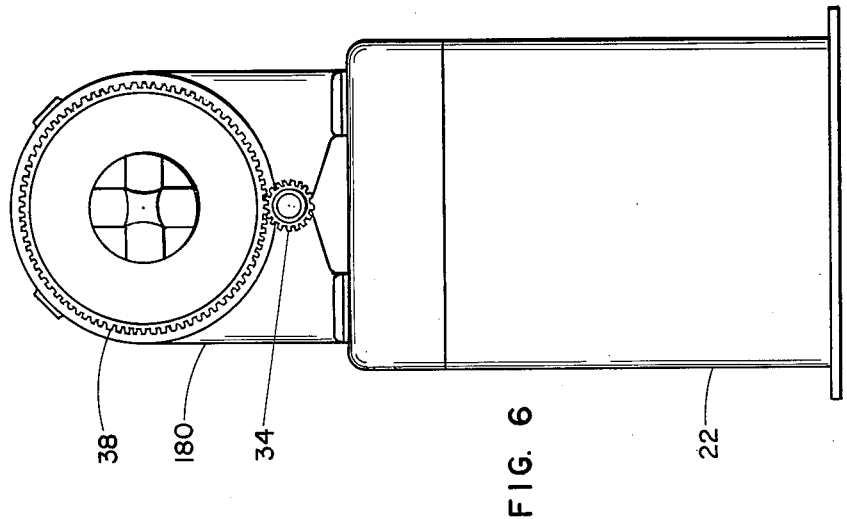
FIG. 6 is a front end elevational view of the paper tube machine of FIG. 1.

As the machine starts, spindle 60 with its associated parts begins to rotate in a clockwise direction as viewed in FIG. 7. This causes the strips of paper 146 (FIG. 2) to be wound about spindle 60. The paper is initially wound on slide members 90 which are moving in a forward direction (toward the left as viewed in FIG. 2) as rollers 102 roll along cam 104. The rearmost edge of the first strip is abutting the diagonally oriented forward face of follower lug 96. This causes the strip to be moved forwardly as it is being wound, to begin the formation of the continuous tube. Additional strips of paper are applied on the top of the initial strip in offset relation by a guide means 121, and a helically wound tube is thus continuously formed on the forwardly moving surfaces of slide members 90. As additional layers of paper tube are added, the tube becomes rigid and self-supporting and continues to move forwardly on slide members 90. Thus, the tube is substantially formed before it leaves the forwardly moving surfaces of slide members 90.

As the roller 102 associated with each slide member drops off the high portion or cam 104, the slide member is moved rapidly to the rear as described above. However, before this occurs, the tube has attained sufficient strength to be self-supporting, and the rapid movement of this slide to the rear breaks the frictional contact between the lubricated inner strip of paper forming the tube, and the slide moves to the rear without affecting the steady forward motion of the tube caused by the other three forwardly moving slide members.

As the newly formed tube slides forwardly on spindle 60, it enters head stock 26 and is creased by the shoe members 240 which are pressed against the spindle on the inside of cylindrical member 190. As described above, these shoe members move forwardly in synchronism with the movement of the tube caused by the slide members 90, and therefore the shoe members assist the forward movement of the tube and prevent buckling thereof. Once during every revolution, however, each shoe member moves to the rear under the influence of a spring 266 (FIG. 14) as described above. Each shoe member moves rearward in succession, while the other three shoe members are still moving forwardly, so that this rearward movement of each shoe member, does not interfere with the uniform forward movement of the tube on the spindle. As each shoe member moves forwardly, as described above, it presses the newly formed tube inwardly against the recessed sides of spindle 60 creasing the length of the tube lying thereunder. Thus, each side of the tube is successively creased by the shoe member in contact therewith during the uniform forward motion of the tube.

This action continues as described above, with the tube being continually formed by the continuous helical winding of superimposed paper strips at one end of the machine and with the tube moving continuously forward in uniform motion and being creased as it passes through tail stock 26. The finished tube then moves off the end of spindle 60 at the front end of the machine where it may be cut into convenient lengths by any suitable means which have not been shown here.

It may thus be seen that the invention herein described accomplishes its stated objects. Once set up and started as described, the machine herein described will continuously form a continuous length of paper tubing of square or other desired polygonal cross-section, and will deliver the same at the front end of the machine. These tubes may then be cut into lengths suitable for the desired end use. Once set up and properly adjusted, this machine is fully automatic and requires no attention from the operator other than the periodic replacement of the rolls of paper strips which are used for forming the tube.

While there has been shown and described the preferred forms of mechanisms of the invention, it will be apparent that various changes and modifications may be made therein, particularly in the form and relation of parts, without departing from the spirit of the invention as set forth in the appended claims.

I claim:

1. A machine for making tubing of polygonal cross-section from strips of web material tending to bow when creased, said machine comprising, in combination, a rotatable spindle having a portion of its length of polygonal cross-section corresponding to the tubing to be made, means for winding a strip of web material around said spindle in a generally helical configuration to form a polygonal tube, means for moving said tube longitudinally on said spindle as it is made, a portion of said spindle being formed with inwardly recessed sides, pressure members having substantially convex bearing surfaces adapted for forcing the walls of said tube inwardly into said recesses for concaving said faces of the tubes between the intersections of the tube faces to cause the tube to assume a more nearly perfect permanent polygonal form after being discharged from said spindle and actuating means reciprocating said pressure members along said spindle in sequence.

2. A machine in accordance with claim 1 wherein said actuating means comprises a fixed cam means and follower means on each of said members engaging said cam means.

3. A machine in accordance with claim 1 including means for forcing said pressure members against said spindle more firmly during forward motion than during rearward motion whereby said pressure members assist in moving said tube forwardly on said spindle during forward motion and slide over said tube during rearward motion for concaving same.

(References on following page)

References Cited in the file of this patent

UNITED STATES PATENTS

| | | |
|---|---|---|
| 1,054,961 | Dean | Mar. 4, 1913 |
| 1,682,045 | Hollmann | Aug. 28, 1928 |
| 1,814,697 | Hollmann | July 14, 1931 |
| 1,872,152 | Maltby | Aug. 16, 1932 |
| 1,913,447 | Huston et al. | June 13, 1933 |
| 1,932,942 | Thordarson | Oct. 31, 1933 |
| 2,453,537 | Phillips | Nov. 9, 1948 |
| 2,709,400 | Bugg | May 31, 1955 |
| 2,722,130 | Caldwell | Nov. 1, 1955 |
| 2,723,605 | Stahl | Nov. 15, 1955 |
| 2,941,453 | Yovanovich | June 21, 1960 |